United States Patent

Mays et al.

Patent Number: 5,278,870
Date of Patent: Jan. 11, 1994

[54] REDUCING INTERFERENCE IN R.F. SIGNALS

[75] Inventors: Len Mays, Billericay; Edmund P. Darbyshire, Orrell, both of United Kingdom

[73] Assignee: GEC-Marconi Limited, Stanmore, United Kingdom

[21] Appl. No.: 684,395

[22] Filed: Apr. 12, 1991

[30] Foreign Application Priority Data

Apr. 17, 1990 [GB] United Kingdom ............... 9008613

[51] Int. Cl.⁵ .......................... H03D 1/06; H04B 1/10
[52] U.S. Cl. ...................................... 375/99; 375/103; 455/307
[58] Field of Search ................. 375/103, 99, 58, 94, 375/101, 13, 76; 364/724.01; 329/349; 455/50, 296, 307

[56] References Cited

U.S. PATENT DOCUMENTS

| 5,020,078 | 5/1991 | Crespo | 375/101 X |
| 5,029,186 | 7/1991 | Maseng et al. | 375/101 X |
| 5,127,051 | 6/1992 | Chan et al. | 375/13 X |

FOREIGN PATENT DOCUMENTS

| 0200505 | 12/1986 | European Pat. Off. . |
| 0206770 | 12/1986 | European Pat. Off. . |
| 0216141 | 4/1987 | European Pat. Off. . |
| 8809591 | 12/1988 | PCT Int'l Appl. . |
| 2198015 | 6/1988 | United Kingdom . |

Primary Examiner—Curtis Kuntz
Assistant Examiner—Tesfaldet Bocure
Attorney, Agent, or Firm—Spencer, Frank & Schneider

[57] ABSTRACT

A radio receiver 1 has a device for reducing interference in an r.f. received signal, for example an HF signal conveying high speed data, including a channel estimator 3 for estimating the transmitted signal by comparing the received signal with locally generated signals processed in dependence on the response of the communication channel, together with a filter 2 for filtering interfering signals from the received signal. The use of the channel estimator for compensating for the response of the communication channel as opposed to an equaliser enables interfering signals to be filtered from the received signal.

9 Claims, 2 Drawing Sheets

REDUCING INTERFERENCE IN R.F. SIGNALS

BACKGROUND OF THE INVENTION

This invention relates to devices for reducing in-band interference in r.f. received signals.

Two of the main sources of interference in such signals (e.g. high speed serial data (2.4 k/bits per second) over an HF communications channel), are interference from other users and multi-path propagation.

Multi-path propagation causes intersymbol interference on digital communication links. Intersymbol interference occurs because each bit of transmitted information arrives at the receiver several times spaced over a wide (of the order of 8 milliseconds) differential time interval. At 2.4 k/bits per second, each bit lasts 0.417 milliseconds, so the transmitted information becomes confused and corrupted at the receiver due to the multiple propagation paths.

There are two techniques known for combating this type of problem. The first is channel equilisation, and this works by passing the received signal through a filter which has a response equivalent to the inverse of the channel through which the signal was received. A disadvantage of this type of system is that it is not always possible to produce such an inverse of the channel.

The other known technique for combating the problem is a channel estimator (e.g. WO-A-88/09591) which works by identifying the response of the channel, and the detection of the data takes place by comparing the received (distorted) data with a locally generated data stream that has been passed through a model of the channel.

SUMMARY OF THE INVENTION

The object of the invention provide a device for reducing in-band interference in an r.f. received signal representing digital data. This object can be attained by a device which includes means for filtering interfering signals from the received signal, and means for deciding the most likely digital data to have been transmitted by comparing the filtered received signal with locally generated signals processed in dependence on the estimated response of the communication channel.

It would not be possible to receive in the presence of interfering signals which the filter means was attempting to attenuate if an equaliser was used to compensate for the response of the channel, since the equaliser would simply attempt to remove the attenuations placed in the interference rejection response.

BRIEF DESCRIPTION OF THE DRAWINGS

A device for reducing interference in an r.f. received signal constructed in accordance with the invention will now be described by way of example with reference to the accompanying drawings, in which.

DESCRIPTION OF THE PREFERRED EMBODIMENT

Figure 1:
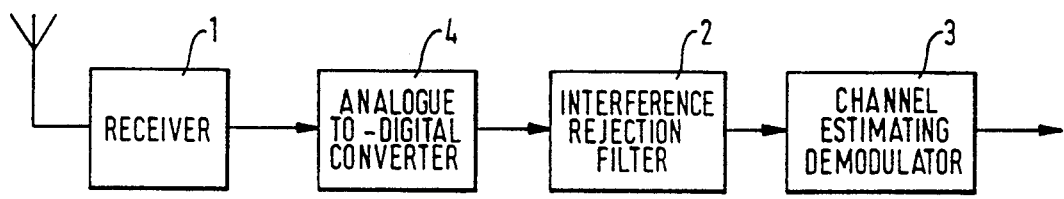
FIG. 1 is a block diagram of the device.

Referring to FIG. 1, the device for reducing interference in an r.f. received signal is incorporated in a radio receiver 1 for receiving SSB transmissions, and comprises an interference rejection circuit 2 and a channel estimating demodulator 3, which receive digital data from an analogue-to-digital converter 4 which converts the audio output of the receiver 1 into digital form.

Figure 2:
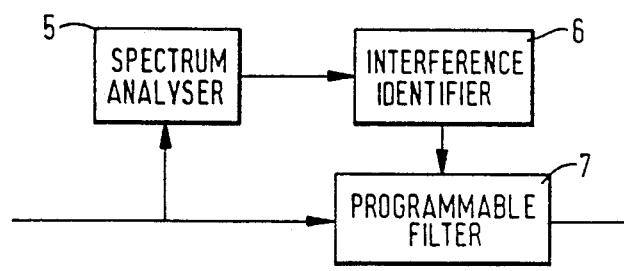
FIG. 2 is a block diagram of the interference rejection filter.
Figure 3:
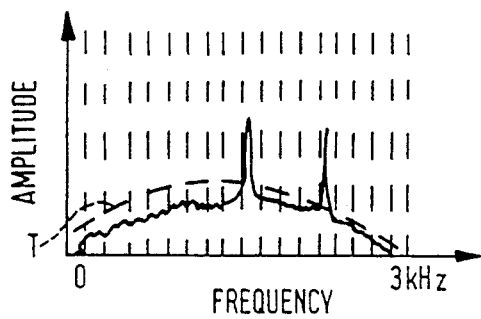
FIG. 3 is a graph of the typical frequency response of a received signal.
Figure 4:
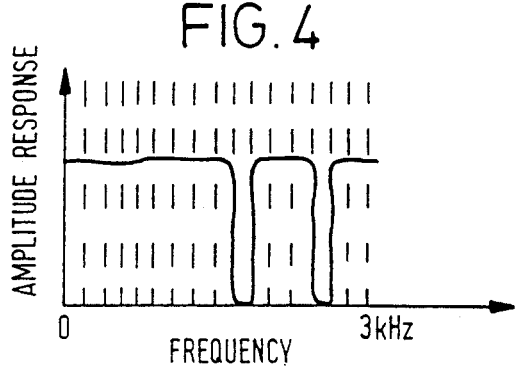
FIG. 4 is a graph of the corresponding response of the programmable filter.
Figure 5:
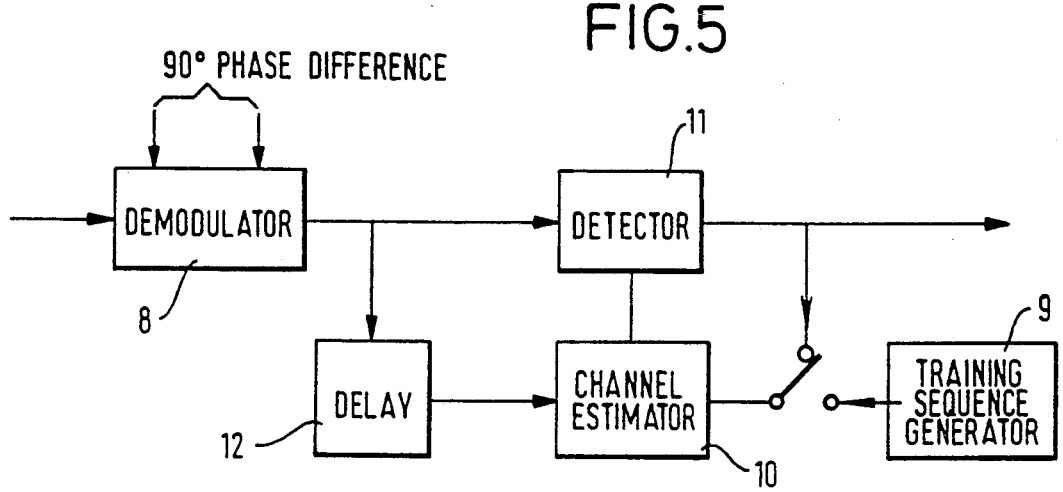
FIG. 5 is a block diagram of the channel estimating demodulator.

Referring to FIGS. 2 to 4, the interference rejection circuit will now be described. A spectrum of a typical audio output is shown in FIG. 3. The two peaks represent interference, e.g. formed by an interfering binary FSK transmission. The received signal is sampled and the corresponding spectrum is produced by spectrum analyser 5. The general shape of the spectrum of the received signal will of course be known and this enables the interference identification circuit 6 to generate a notional template T having the same general shape of spectrum as the transmitted signal. At the same time, the frequency spectrum is divided into a number of equal sub-bands across the spectrum of the signal in circuit 6. The amplitude of the spectrum is assessed in each sub-band, and the sub-bands e.g. six sub-bands, of lowest amplitude are averaged. The template is then superimposed on the frequency spectrum by relating its level to the level of the average of the six lowest sub-bands.

Having done this, the circuit then assesses for each band whether the amplitude of the actual frequency response lies above or below the template and, if the amplitude lies above, the programmable filter 7 generates a notch for that sub-hand. If the output lies below the template, no notch is generated. Thus, the interfering peaks will result in corresponding notches in the programmable filter 7 (FIG. 4), and the output of the filter 7 will have the interference filtered from it. The filter can be updated as often as desired. The notches are of uniform depth.

The description of the demodulator 3 which follows assumes four-phase modulation of the transmitted carrier wave so that each transmitted symbol represents two bits of the data input to the modulator at the transmitter. As will become apparent, demodulator 3 serves to decide what data was most likely to have been transmitted.

Figure 6:
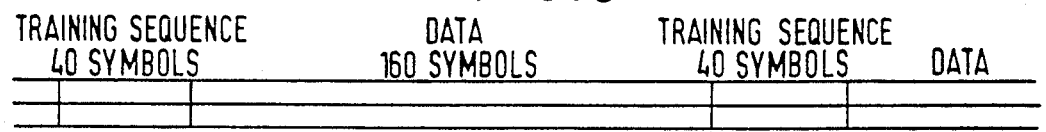
FIG. 6 is a diagram illustrating the transmitted data stream in schematic form.

The channel estimating demodulator 3 receives the filtered signal and demodulates it in demodulator 8 with a complex tone at the subcarrier frequency, i.e. signals 90° out of phase, to produce two streams of samples, one in-phase and the other quadrature. A typical sequence of samples is shown in FIG. 6. The transmitter transmits 160 symbols of data followed by 40 reference (training) symbols in frames of 200 symbols. The same 40 reference symbols are stowed in the demodulator in training sequence generator 9. Each symbol can have one of four values, i.e. 00, 01, 10, 11, which may be represented on the signal constellation diagram in FIG. 7.

Frame timing is initially established by correlation with the known training sequence.

It will be appreciated that the carrier frequency is in the HF bond (3-30 MHz) and transmission will normally be by sky wave. The ionosphere is liable to produce multiple reflections of the transmitted signal, and the received signal will consequently suffer from multipath distortion. The frequency response of this communication channel can be ascertained or, rather, its impulse response can be determined, and then possible combinations of signals can be passed through to ascertain which is the nearest to the received signal and hence the likeliest one to have been transmitted.

In the presence of multipath and interference excision the output of the demodulator 8 would be a severely distorted version of the constellation. It is the function of the channel estimating decoder 10 to recover the original transmitted data without the application of an inverse filtering operation.

The impulse response of the communication channel, which includes both the ionospheric path and the excision filter 2, is estimated by comparing the distorted training sequence symbols appearing at the output of the demodulator 8 with the training sequence symbols in generator 9, which are identical to those in the transmitted signal. The impulse response estimate is made up, for example, of twelve complex values of 16 bits real and 16 bits imaginary.

The channel estimator update algorithm has two modes of operation. For operation in each mode it requires three inputs. These are: the received (distorted) data symbols; a model of the complex impulse response of the ionospheric path plus the excision filters (the channel estimate itself); and a digital reference signal. The last, during training, is the appropriate "n" successive symbols of the known, locally generated, training sequence and, during decision-directed operation, is an array of the "n" most recent decisions made by the detector (where n is the length of the channel estimate, measured in symbol periods).

In its simplest form, the operation of the channel estimating demodulator is as follows. It is assumed that the channel estimator 10 already contains a model of the impulse response of the transmission channel (including filter 2), and that it contains a series of the n most recent decisions made by the detector 11.

Figure 7:
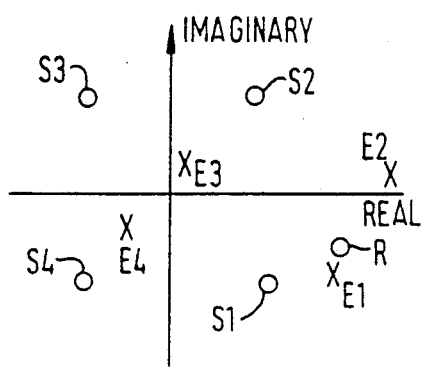
FIG. 7 is a signal constellation diagram.

It will be remembered that each new symbol received at the output of the delay 12 could result from any one of four possible transmitted symbols, S1, S2, S3 or S4 (FIG. 7). The series of n most recent decisions is thus expanded into four series of n symbols, the oldest symbol being discarded to hold the length at n, the last symbol being each of the four possible symbols. Each of the four series of n symbols thus obtained is convolved with the impulse response of the channel estimate, and four estimates of the symbol which was actually transmitted are obtained. For example, these could be represented by the points E1, E2, E3 and E4 in FIG. 7, while the actual symbol newly arrived at the output of delay 7 could be R as shown in FIG. 7. Each estimate is associated with a cost, which gives a measure of the distance on the signal constellation diagram between each estimate and the respective received symbol.

A decision is made in favour of the estimate with the lowest cost, in the case of FIG. 7, estimate E1, and the decision thus assumes that symbol 31 is the most likely to have been transmitted.

Because the ionosphere changes rapidly, the channel estimate may not be valid for symbols arriving subsequently. Consequently, the cost of the estimate decided upon is used to update the model of the complex channel impulse response (channel estimate).

At the beginning of each received data frame, all the components of the channel estimate array are cleared to zero value. The new estimate is then constructed by successive once-per-symbol iterations of the channel estimator update process using the appropriate symbols of the known training sequence in place of the decision sequence (history). During this time the detection process is not required.

After the end of the training period the updating process must be suspended for a period equal to the delay in the data detection process. When (decision-directed) update is resumed, the last "n" symbols of the known training sequence are used as the digital reference sequence input to the channel estimator. On successive symbols thereafter, the new data decisions are appended to this decision history, and its oldest components are discarded to hold its length at "n".

To improve the accuracy of the decisions, instead of using a single series of n previous decisions, a larger number of series of previous symbols may be used. In this case some of the n symbols will not be the decisions but will be other symbols which could also (perhaps with lower probability) have produced the received symbol. Each of these series are expanded with each of the four possible symbols S1, S2, S3 and S4 and convolved with the model of the impulse response of the channel and filter 7. A larger number of estimates and associated costs will be produced and a decision made in favour of one of them.

Further accuracy may be gained by using several models of the impulse response of the channel and filter 7, each expanded series of n symbols being convolved with each model of the impulse response, producing a larger number of estimates and costs. In this case, the detector becomes similar to a "Viterbi" decoder, i.e. a maximum likelihood or near maximum likelihood detector (except that a reduced number of channel estimates are used). Examples of this type of detection process are described in "Adaptive Detectors for Digital Modems" by A. P. Clark, published in 1989 by the Pentech Press, London.

The advantage of using a channel estimating demodulator to compensate for the response of the channel is that it does not counteract the operation of the interference rejection filter. If an equaliser was used to compensate for the response of the channel, this would also attempt to equalise the notches in the interference rejection filter, and the operation of the interference rejection filter would be nullified.

Variations may be made without departing from the scope of the invention. Thus, instead of using the interference rejection filter described, an adaptive filter may be used. Such a filter monitors its output to minimise mean square output power. The effect of this would be to attenuate any peaks in the spectrum of the received signal. In this case, the spectrum of the received signal is not monitored as such, and this alternative is only of use where the spectrum of the transmitted signal is known to be basically flat, so that the peaks which the adaptive filter attempts to attenuate are from interfering signals. Also, the invention is applicable as well to the VHF region of the spectrum and other regions, and is also applicable to data rates other than those referred to. While the components of the device have been described in terms of hardware, the invention is also applicable to the case where they are implemented by software.

We claim:

1. A device for reducing in-band interference in an r.f. received signal representing digital data, comprising interference rejection filter means for filtering interfering signals from the received signal by generating notches responsive to the interfering signals, and means for deciding the most likely digital data to have been transmitted, the decision means including means for locally generating signals, means for estimating the response of the communication channel, and means for comparing an output derived from the interference rejection filter means with an output derived from the local signal generating means processed in dependence on the estimated response of the communication channel estimated by the channel estimating means.

2. A device as claimed in claim 1, in which the interference rejection filter means is arranged to produce attenuation at frequencies at which the r.f. received signal spectrum has peaks which are not present in the known spectrum of the transmitted signal.

3. A device as claimed in claim 2, in which the interference rejection filter means is arranged to produce the attenuation in response to a comparison of the spectrum of the received signal with the known spectrum of the transmitted signal.

4. A device as claimed in claim 1, in which the received signal represents a digital stream of data symbols interspersed with reference symbols, each symbol having a number of discrete values, the reference symbol values being a sequence of predetermined values, and the local signal generating means being capable of generating the sequence of predetermined values.

5. A device as claimed in claim 4, in which in use the estimated response of the channel is updated using the respective values of the reference symbols as received and the respective discrete values of the locally generated sequence of reference symbols.

6. A device as claimed in claim 5, in which in use, for each newly received data symbol value, a plurality of series of decision of the most likely discrete value to have been transmitted each together with a different possible discrete value representing the newly received symbol are convolved with the impulse response of the estimate of the response of the channel, in order to obtain the most likely discrete value of the newly received data sample.

7. A device as claimed in claim 1, in which the r.f. carrier frequency is in the range of 3 to 30 MHz.

8. A device for reducing in-band interference in an r.f. received signal representing digital data, comprising means for filtering interfering signals from the received signal, the filter means being arranged to produce notches of uniform depth at the frequencies at which it attenuates, and means for deciding the most likely digital data to have been transmitted, the decision means including means for locally generating signals, means for estimating the response of the communication channel, and means for comparing an output derived from the filter means with an output derived from the local signal generating means processed in dependence on the estimated response of the communication channel estimated by the channel estimating means.

9. A radio communications apparatus comprising:
a receiver to receive an r.f. signal representing digital data, the received signal being susceptible to in-band interference; and
means for reducing in-band interference in the received signal, the means for reducing including
interference rejection filter means for filtering interfering signals from the received signal by generating notches responsive to the interfering signals,
means for deciding the most likely digital data to have been transmitted, the decision means including means for locally generating signals, means for estimating the response of the communication channel, and means for comparing an output derived from the interference rejection filter means with an output derived from the local signal generating means processed in dependence on the estimated response of the communication channel estimated by the channel estimating means.

* * * * *